US011978302B2

(12) United States Patent
Fong

(10) Patent No.: US 11,978,302 B2
(45) Date of Patent: May 7, 2024

(54) ELECTRONIC GAMING MACHINE AND METHOD FOR DETERMINING CONCATENATED PRIZE VALUES

(71) Applicant: Aristocrat Technologies Australia Pty Limited, North Ryde (AU)

(72) Inventor: Colin Fong, Penshurst (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 29 days.

(21) Appl. No.: 17/697,728

(22) Filed: Mar. 17, 2022

(65) Prior Publication Data

US 2022/0207956 A1 Jun. 30, 2022

Related U.S. Application Data

(63) Continuation of application No. 17/068,640, filed on Oct. 12, 2020, now Pat. No. 11,288,915, which is a continuation of application No. 16/352,544, filed on Mar. 13, 2019, now Pat. No. 10,810,831.

(30) Foreign Application Priority Data

Mar. 29, 2018 (AU) ................................ 2018202257

(51) Int. Cl.
*G07F 17/32* (2006.01)

(52) U.S. Cl.
CPC ...... *G07F 17/3213* (2013.01); *G07F 17/3244* (2013.01)

(58) Field of Classification Search
CPC ............. G07F 17/3213; G07F 17/3244; G07F 17/3262; G07F 17/34
See application file for complete search history.

(56) References Cited

U.S. PATENT DOCUMENTS

| | | | |
|---|---|---|---|
| 5,205,555 | A | 4/1993 | Hamano |
| 7,341,513 | B2 | 3/2008 | Cuddy |
| 7,354,344 | B2 | 4/2008 | Paulsen |

(Continued)

FOREIGN PATENT DOCUMENTS

| | | | |
|---|---|---|---|
| WO | 2017197432 | A1 | 11/2017 |

OTHER PUBLICATIONS

Australian Examination Report No. 1 for App. No. AU2019250169, dated Dec. 5, 2020, 5 pages.

(Continued)

*Primary Examiner* — Jasson H Yoo
(74) *Attorney, Agent, or Firm* — Armstrong Teasdale LLP

(57) ABSTRACT

An electronic gaming machine includes a display device, and a processor configured to execute instructions stored in a memory. When executed, the instructions cause the processor to select a first plurality of symbols for a first level of play of a feature game, where each of the first plurality of symbols are selected from a plurality of feature symbols including at least one number symbol and at least one designated symbol. The instructions also cause the processor to control the display device to display the first plurality of symbols in a first row of symbol positions, and in response to determining that the first plurality of symbols include at least two number symbols, concatenate the at least two number symbols to determine a first prize value equal to the concatenated value of the at least two number symbols.

20 Claims, 7 Drawing Sheets

(56) References Cited

U.S. PATENT DOCUMENTS

| | | | | |
|---|---|---|---|---|
| 7,371,169 | B2 | 5/2008 | Baerlocher | |
| 7,413,510 | B2 | 8/2008 | Schlegel | |
| 7,967,674 | B2 | 6/2011 | Baerlocher | |
| 8,002,625 | B2 | 8/2011 | Maya | |
| 9,011,237 | B2 | 4/2015 | Sims | |
| 10,810,831 | B2 * | 10/2020 | Fong | G07F 17/3262 |
| 11,288,915 | B2 * | 3/2022 | Fong | G07F 17/3213 |
| 2003/0114217 | A1 * | 6/2003 | Walker | G07F 17/3262 463/20 |
| 2003/0190949 | A1 * | 10/2003 | Williams | G07F 17/3206 463/24 |
| 2005/0054435 | A1 * | 3/2005 | Rodgers | G07F 17/3267 463/20 |
| 2006/0084497 | A1 | 4/2006 | Marks | |
| 2011/0136562 | A1 | 6/2011 | Loat | |
| 2017/0228976 | A1 | 8/2017 | Chesworth | |
| 2018/0130285 | A1 * | 5/2018 | Ang | G07F 17/3244 |

OTHER PUBLICATIONS

Office Action dated Mar. 19, 2020, for U.S. Appl. No. 16/352,544 (pp. 1-16).

Notice of Allowance dated Jun. 18, 2020 for U.S. Appl. No. 16/352,544 (pp. 1-14).

Office Action (Non-Final Rejection) dated Aug. 16, 2021 for U.S. Appl. No. 17/068,640 (pp. 1-17).

Office Action (Notice of Allowance and Fees Due (PTOL-85)) dated Dec. 1, 2021 for U.S. Appl. No. 17/068,640 (pp. 1-7).

Australian Examination Report No. 1 issued in App. No. AU2021277765, dated Dec. 21, 2022, 4 pages.

Australian Examination Report No. 2 issued in App. No. AU2021277765, dated Dec. 20, 2023, 4 pages.

* cited by examiner

500

531

| | Reel position | Reel 1 (521) | Reel 2 (522) | Reel 3 (523) | Reel 4 (524) | Reel 5 (525) |
|---|---|---|---|---|---|---|
| 501 | 1 | Pic 1 | 10 | Pic 3 | Q | Pic 1 |
| 502 | 2 | Wild | Q | K | A | 10 |
| 503 | 3 | J | K | 10 | 10 | A |
| 504 | 4 | Q | A | Q | Pic 2 | Pic 2 |
| 505 | 5 | 10 | Pic 2 | K | J | A |
| 506 | 6 | A | 9 | Pic 1 | Wild | Q |
| 507 | 7 | Pic 2 | Wild | J | 9 | K |
| 508 | 8 | A | Pic 3 | K | 10 | Pic 2 |
| 509 | 9 | Q | Q | 9 | A | 9 |
| 510 | 10 | K | 10 | Q | Q | Wild |
| 511 | 11 | J | A | 10 | J | 9 |
| 512 | 12 | 10 | Wild | Wild | K | Q |
| 513 | 13 | Pic 3 | K | A | Wild | 10 |
| 514 | 14 | Wild | J | A | Pic 3 | Wild |
| 515 | 15 | 9 | 10 | Wild | Pic 1 | A |

543 542 541

*FIG. 5*

ELECTRONIC GAMING MACHINE AND METHOD FOR DETERMINING CONCATENATED PRIZE VALUES

CROSS-REFERENCE TO RELATED APPLICATIONS

This application is a continuation of U.S. patent application Ser. No. 17/068,640, filed Oct. 12, 2020, which is a continuation of U.S. patent application Ser. No. 16/352,544, filed Mar. 13, 2019, which claims priority to Australian Patent Application No. 2018202257, filed on Mar. 29, 2018, the entireties of which are incorporated herein by reference.

FIELD

The present disclosure relates generally to an electronic gaming machine and method, and more particularly, to an electronic gaming machine and method for determining concatenated prize values.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, an electronic gaming machine is provided. The electronic gaming machine includes a display device, and a processor configured to execute instructions stored in a memory. When executed, the instructions cause the processor to at least select a first plurality of symbols for a first level of play of a feature game, where each of the first plurality of symbols are selected from a plurality of feature symbols including at least one number symbol and at least one designated symbol. The instructions also cause the processor to control the display device to display the first plurality of symbols in a first row of symbol positions, and in response to determining that the first plurality of symbols include at least two number symbols, concatenate the at least two number symbols to determine a first prize value equal to the concatenated value of the at least two number symbols. In addition, the instructions cause the processor, in response to determining that the first plurality of symbols include at least one designated symbol, to select a second plurality of symbols for a second level of play of the feature game, and control the display device to display the second plurality of symbols in a second row of symbol positions.

In another aspect, a method for calculating one or more prize values from a plurality of number symbols is provided. The method includes selecting, by a processor, a first plurality of symbols for a first level of play of a feature game, where each of the first plurality of symbols are selected from a plurality of feature symbols including at least one number symbol and at least one designated symbol. The method also includes controlling, by the processor, a display device to display the first plurality of symbols in a first row of symbol positions, and in response to determining that the first plurality of symbols include at least two number symbols, concatenating, by the processor, the at least two number symbols in the first row of symbol positions to determine a first prize value equal to the concatenated value of the at least two number symbols. In addition, the method includes, in response to determining that the first plurality of symbols include at least one designated symbol, selecting, by the processor, a second plurality of symbols for a second level of play of the feature game, and controlling, by the processor, the display device to display the second plurality of symbols in a second row of symbol positions.

In yet another aspect, an electronic gaming machine is provided. The electronic gaming machine includes a display device, and a processor configured to execute instructions stored in a memory. When executed, the instructions cause the processor to at least initiate play of a base game in response to a wager input from a player, and initiate, during play of the base game, play of a feature game in response to a trigger event occurring during play of the base game. The instructions also cause the processor to select, during the feature game, a first plurality of symbols for a first level of play of a feature game, where each of the first plurality of symbols are selected from a plurality of feature symbols including at least one number symbol and at least one designated symbol. In addition, the instructions cause the processor to control the display device, during the feature game, to display the first plurality of symbols in a first row of symbol positions, and in response to determining that the first plurality of symbols include at least two number symbols, concatenate the at least two number symbols to determine a first prize value equal to the concatenated value of the at least two number symbols. The instructions also cause the processor, in response to determining that the first plurality of symbols include at least one designated symbol, to select a second plurality of symbols for a second level of play of the feature game, and control the display device to display the second plurality of symbols in a second row of symbol positions.

Embodiments of the invention also provide a gaming device, a method of operating a gaming device and a gaming system where at least during part of a game, such as a feature game, one or more game instances are generated by selecting symbols for display from reel strips that have a mixture of number symbols and designated symbols. For each game instance, prize amounts are formed by concatenating the values of number symbols that are displayed at evaluation positions. A further game instance is generated if one of the symbols displayed at the evaluations positions is a designated symbol, otherwise the part of the game ends.

In one embodiment a gaming device comprises a display, a processor, and memory. The memory stores symbol data specifying a plurality of selectable symbols comprising a plurality of number symbols that are used to determine a prize amount, and at least one designated symbol. The memory also stores a meter and instructions. When the instructions are executed by the processor, they cause the processor to (a) select symbols from the symbol data for display on the display at respective ones of a plurality of evaluation positions, whereby the number of number symbols selected and the number of designated symbols selected are inter-dependent, (b) form a prize amount from each number symbol displayed at the symbol display values by concatenating numbers of the number symbols, and (c) add the formed prize to the meter. The processor repeats steps (a) to (c) if the symbols displayed at the plurality of evaluation positions include one or more designated symbols, and does not repeat steps (a) to (c) if the symbols displayed at the plurality of evaluation positions do not include one or more designated symbols.

Another embodiment provides a method of operating a gaming device comprising a display and memory storing (a) symbol data specifying a plurality of selectable symbols comprising a plurality of number symbols that are used to determine a prize amount and at least one designated symbol t, and (b) a meter. The method comprises (a) selecting symbols from the symbol data for display on the display at respective ones of a plurality of evaluation positions, whereby the number of number symbols selected and the number of designated symbols selected are inter-dependent, forming a prize amount from each number symbol displayed at the symbol display values by concatenating numbers of the number symbols, (c) adding the formed prize to the meter, (d) repeating steps (a) to (c) if the symbols displayed at the plurality of evaluation positions include one or more designated symbols, and (e) not repeating steps (a) to (c) if the symbols displayed at the plurality of evaluation positions do not include one or more designated symbols.

Another embodiment provides a gaming system comprising a display, one or more processors, and at least one memory. The at least one memory stores symbol data specifying a plurality of selectable symbols comprising a plurality of number symbols that are used to determine a prize amount, and at least one designated symbol. The memory also stores a meter and instructions. When the instructions are executed by the one or more processors, they cause the one or more processors to) select symbols from the symbol data for display on the display at respective ones of a plurality of evaluation positions, whereby the number of number symbols selected and the number of designated symbols selected are inter-dependent, (b) form a prize amount from each number symbol displayed at the symbol display values by concatenating numbers of the number symbols, and (c) add the formed prize to the meter. The one or more processors repeat steps (a) to (c) if the symbols displayed at the plurality of evaluation positions include one or more designated symbols, and do not repeat steps (a) to (c) if the symbols displayed at the plurality of evaluation positions do not include one or more designated symbols.

BRIEF DESCRIPTION OF THE DRAWINGS

FIG. 5 illustrates an example reel strip layout.

DETAILED DESCRIPTION

Figure 1:
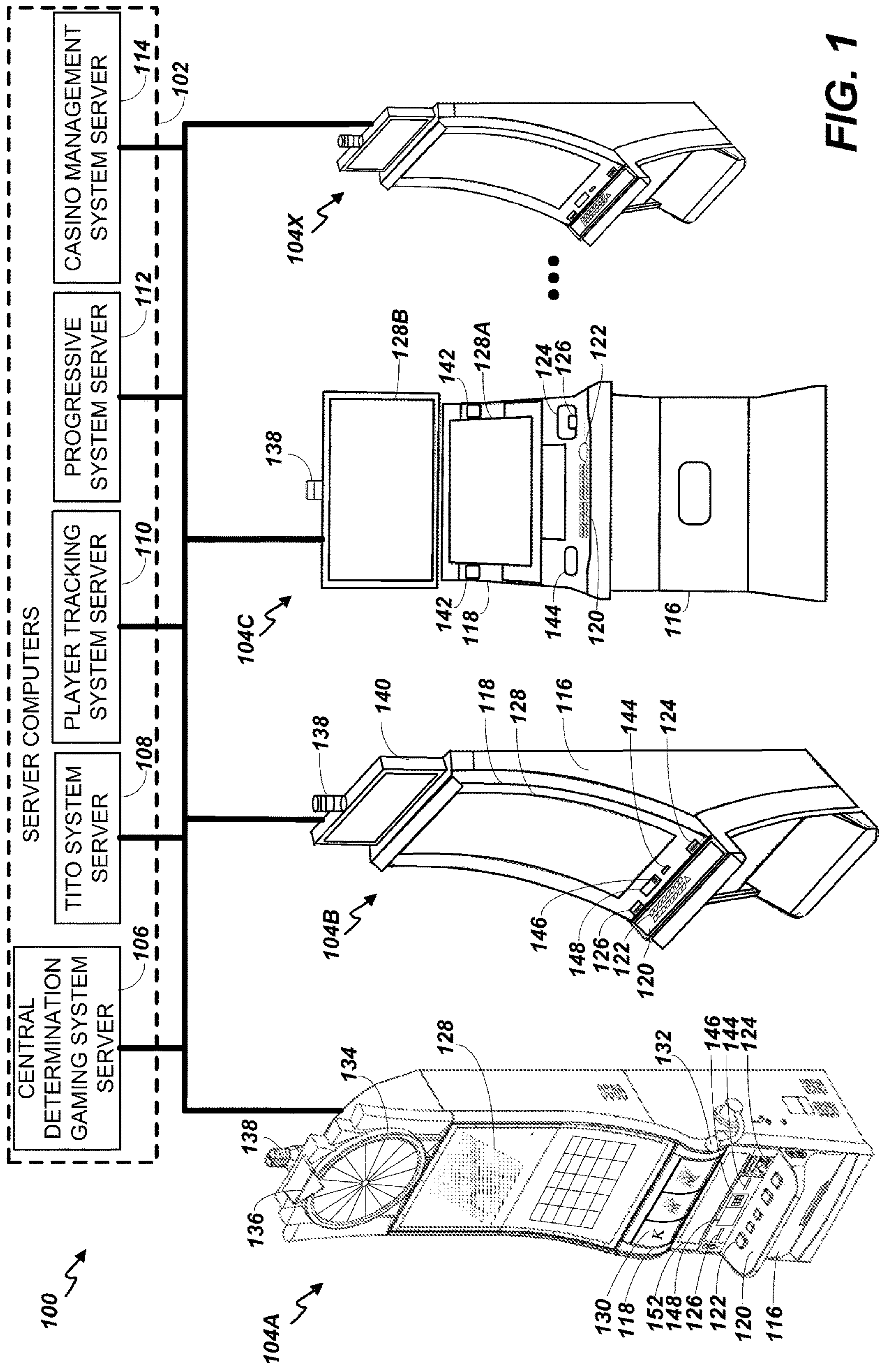
FIG. 1 is an exemplary diagram showing several EGMs networked with various gaming related servers.

FIG. 1 illustrates several different models of EGMs which may be networked to various gaming related servers. The present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
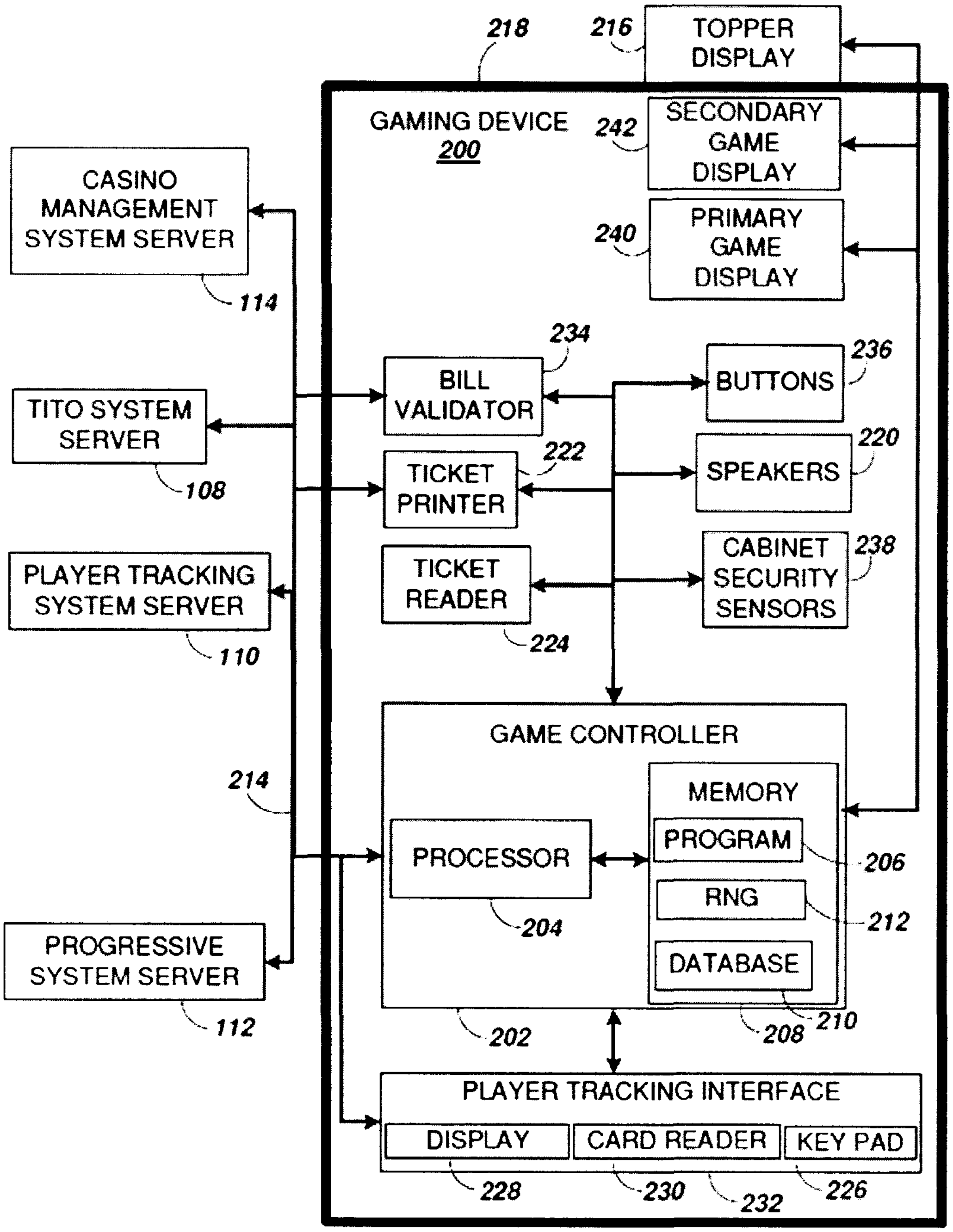
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's Level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher (or another form of readable token) through an appropriate input device such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a bonus game). The player may make these selections using the player-input buttons 236, the primary game display 240 which may be a touch screen, or using some other input device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance using an output device that can output at least one of physical currency and a token representing currency (typically by pressing a cash out button to receive a ticket from the ticket printer 222). The ticket may be "cashed-in" for money or inserted into another machine to establish a credit balance for play.

Figure 3:
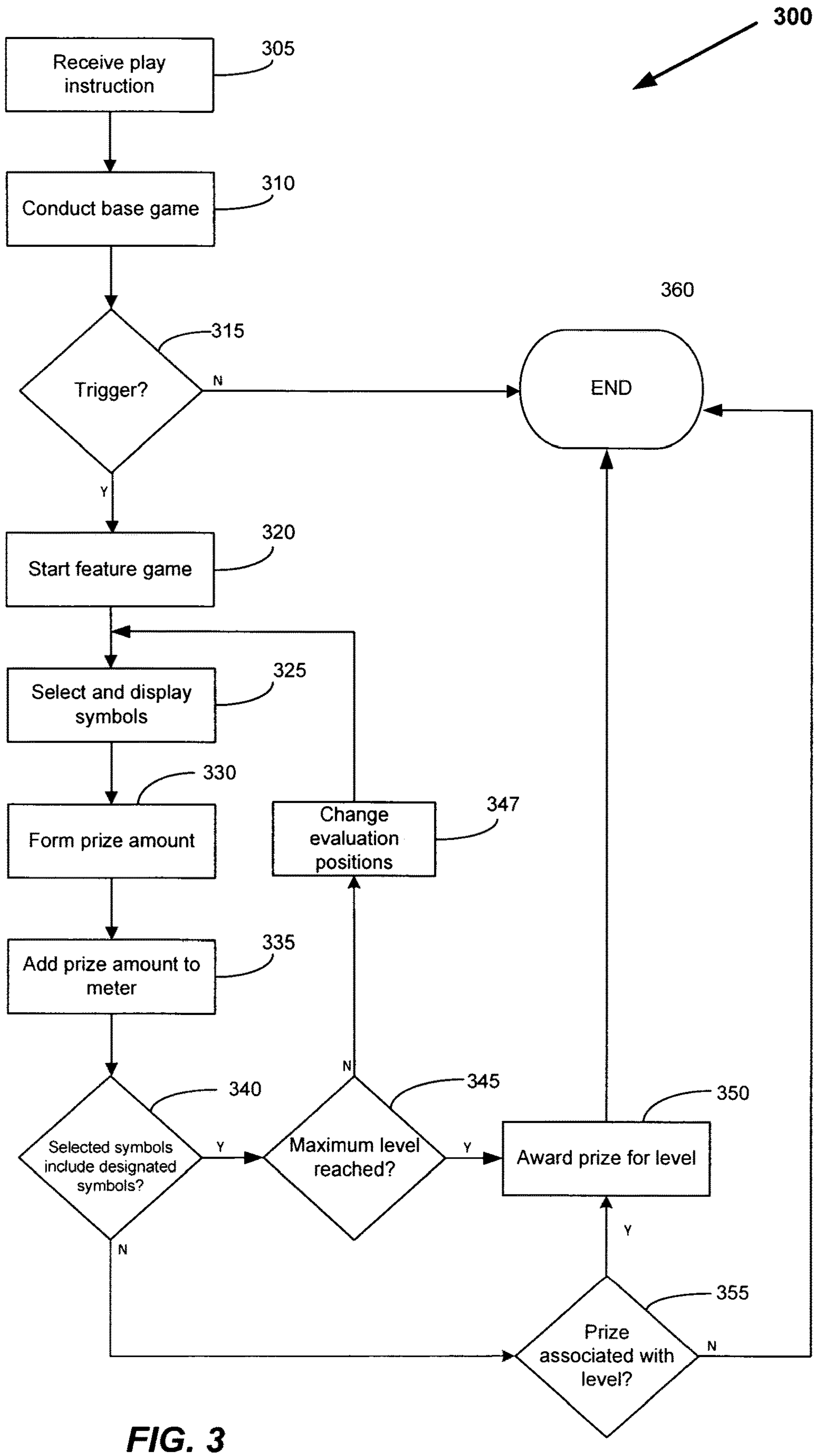
FIG. 3 is a flow chart illustrating the steps of a gaming method implemented by software executed by the processor of a gaming device.

FIG. 3 is a flow chart illustrating the steps of a gaming method 300 implemented by software 206 executed by processor 204. The gaming method 300 is also able of being implemented across multiple components of the above described gaming system 100.

At step 305 the gaming device 200 receives player selections in relation to play of the game including an initiate play instruction.

In some embodiments, the gaming method 300 incorporates a base game and a feature game. However, in other embodiments, the feature game of the embodiments could be implemented as a standalone game or could be one of a plurality of feature games that could be triggered from the base game.

Accordingly, at step 310, the processor 204 executes instructions of program code 206 in memory 208 that cause the processor to conduct a base game in response to the receipt of the play instruction. In an embodiment, the base game is a spinning reel game and the processor conducts the base game by using the random number generator 212 to select stopping positions for each of a plurality of base game reels stored in memory 208 in order to display a plurality of symbols for each reel on display 240.

FIG. 5 illustrates an example of a set 500 of five reel strips 521, 522, 523, 524, 525. In the example, each reel strip has fifteen reel strip positions 501-515. Each reel strip position of each reel has a symbol. For example, a "Wild" symbol 531 occupies the sixth reel strip position 506 of the fourth reel 524. Other reel strips to those illustrated in FIG. 5 can be used, for example, reel strips where two or more wild symbols are placed at consecutive reel strip positions of a reel strip. In other examples, the reel strips could have between 30 and 100 reel strip positions. The actual length of the feature game reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 6:
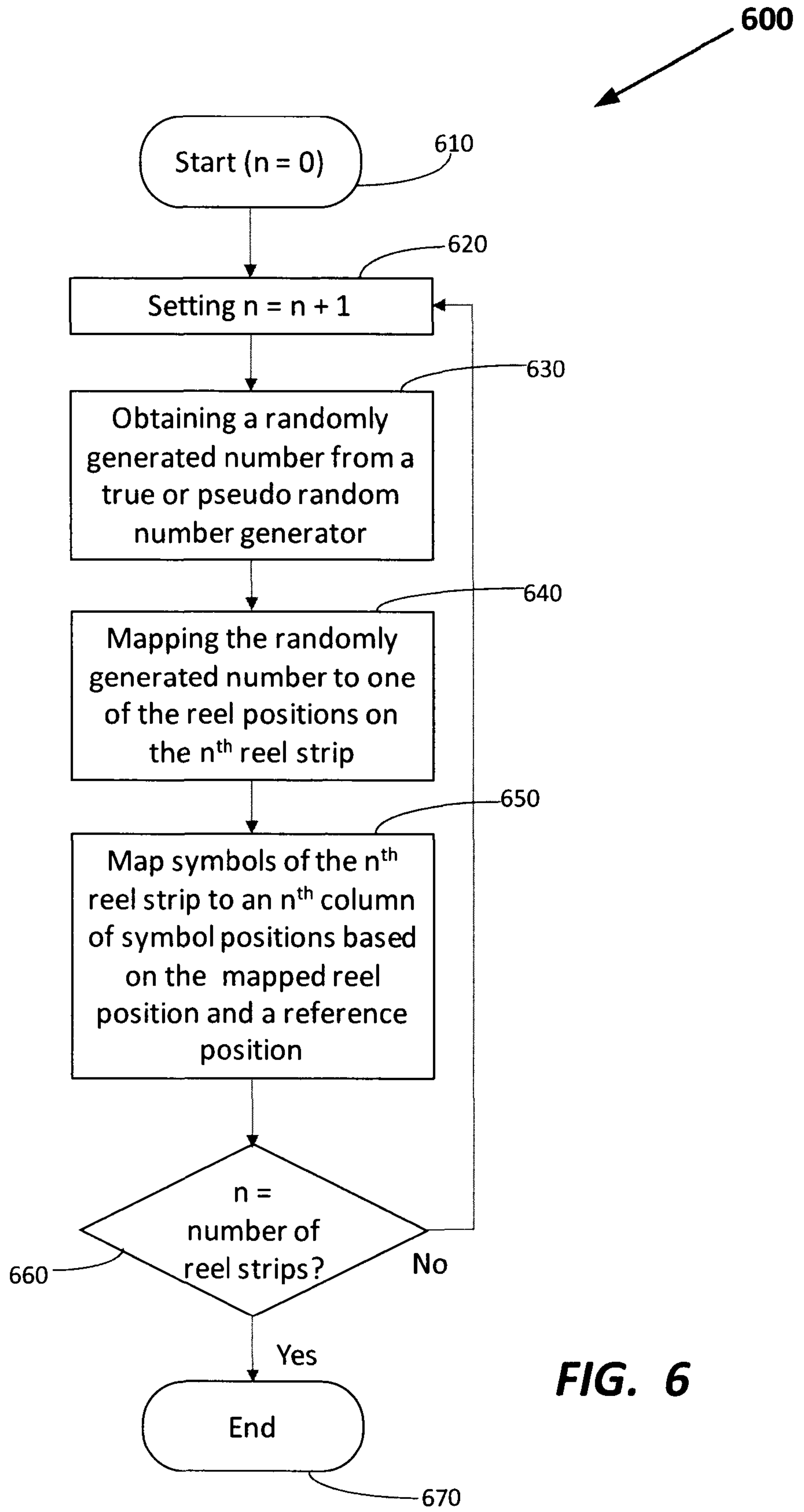
FIG. 6 is a flow chart of a symbol selection method.

FIG. 6 is a flow chart of an exemplary method 600 carried out by the processor 204 to select symbols from reel strips 500. At step 610, the processor 204 starts the process of selecting symbols with a counter (n) set at zero as symbols have not yet been selected from any reel strips. At step 620, the processor 204 increments the counter. In the first iteration, the counter is set to 1 to reflect that symbols are to be selected from a first reel strip. At step 630 the processor obtains a randomly generated number from a true or pseudo random number generator 212. At step 640 the processor maps the generated number to one of the reel positions of the nth reel strip. In the first iteration, this is the first reel strip. To map the generated number to one of the reel positions, in various embodiments, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of being selected. In other examples, the ranges may be arranged to weight the relative chances of selecting specific reel strip positions. The reel strips may be of different lengths.

At step 650, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 5, if the value returned by the RNG 212 is mapped to reel position 513, then for the first reel strip 521, "Pic3" symbol 543 is mapped to a bottom symbol position, "10" symbol 542 is mapped to a middle symbol position, and "J" symbol is mapped to a top symbol position.

At step 660, the processor 660 determines whether symbols have been selected for all of the reel strips, and if not the processor reverts to step 620 and iterates through steps 630, 640 and 650 until it is determined at step 660 that symbols have been selected from all n reel strips and mapped to all n columns of symbol positions after which the symbol selection process ends 670. Different numbers of symbols may be mapped to different numbers of symbol positions.

After the symbols of all reel strips have been mapped to symbol position, the processor 204 controls display 240 to display them at the symbol positions.

The processor 204 evaluates the selected symbols using a pay table stored in memory 208 to determine whether to make one or more awards for winning combinations of symbols. Any awards are added to a win meter stored in memory 208.

At step 315, processor 204 determines whether a trigger condition is met in respect of the base game. In one example, the trigger condition is a symbol combination stored in memory 208, for example, a defined number of scatter symbols.

If it is determined at step 315 that the trigger condition is not met, then the game ends at step 360. In some embodiments, when the game ends, the processor transfers any amount of credits on win meter to a credit meter stored in memory 208. In other embodiments, any amount on the win meter is transferred to the credit meter when another game is initiated, if the player presses the cash out button, or if a defined time period lapses.

If a trigger condition is met, at step 320, the processor 204 starts a feature game 320. In an embodiment, the processor controls the primary game display 240 to replace the display of the base game with display of feature game. In another embodiment, the feature game is displayed on the secondary game display 242 when the feature game is triggered.

Figure 4A:
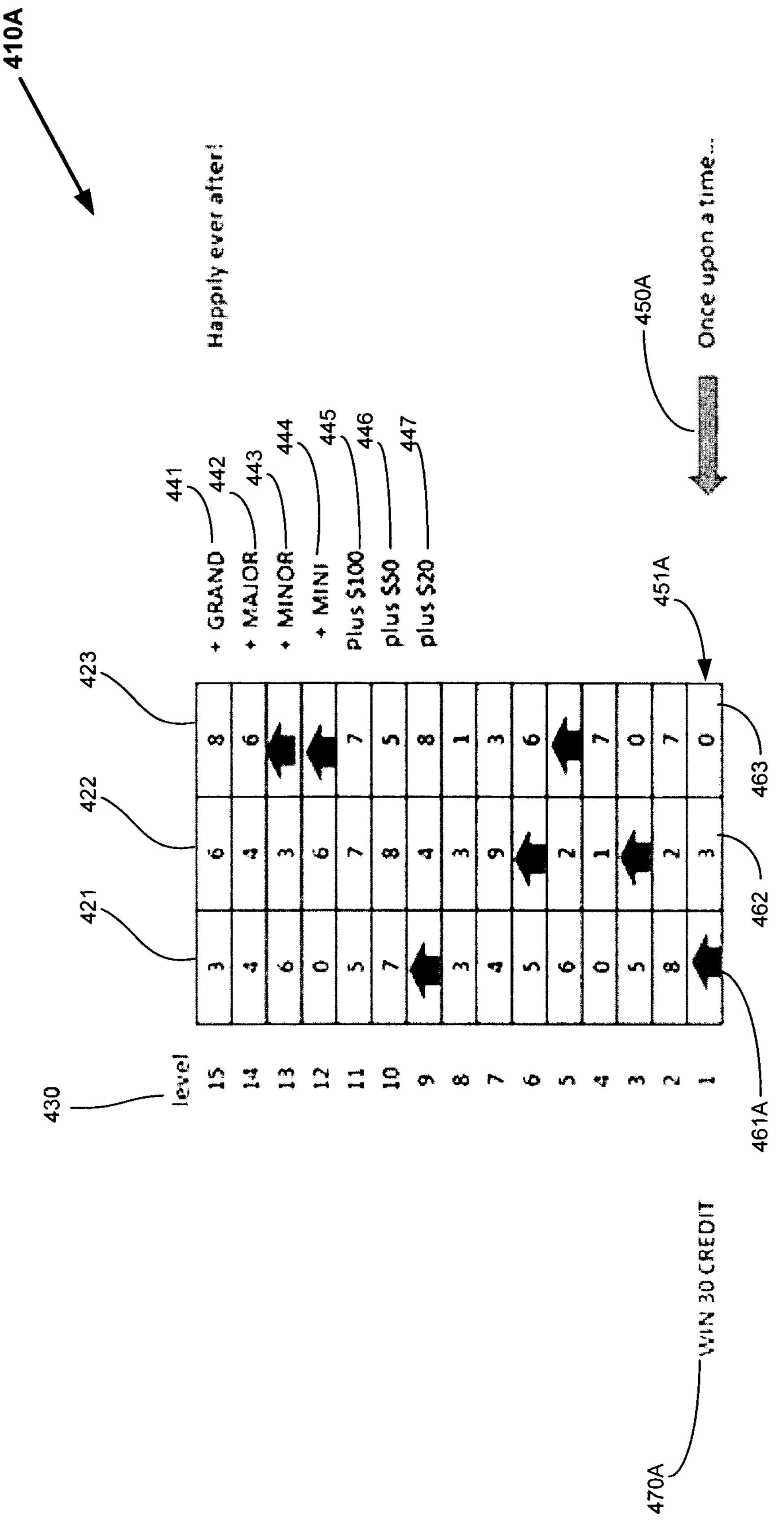
FIGS. 4A and 4B are schematic diagrams of example game instances resulting from implementation of the gaming method.
Figure 4B:
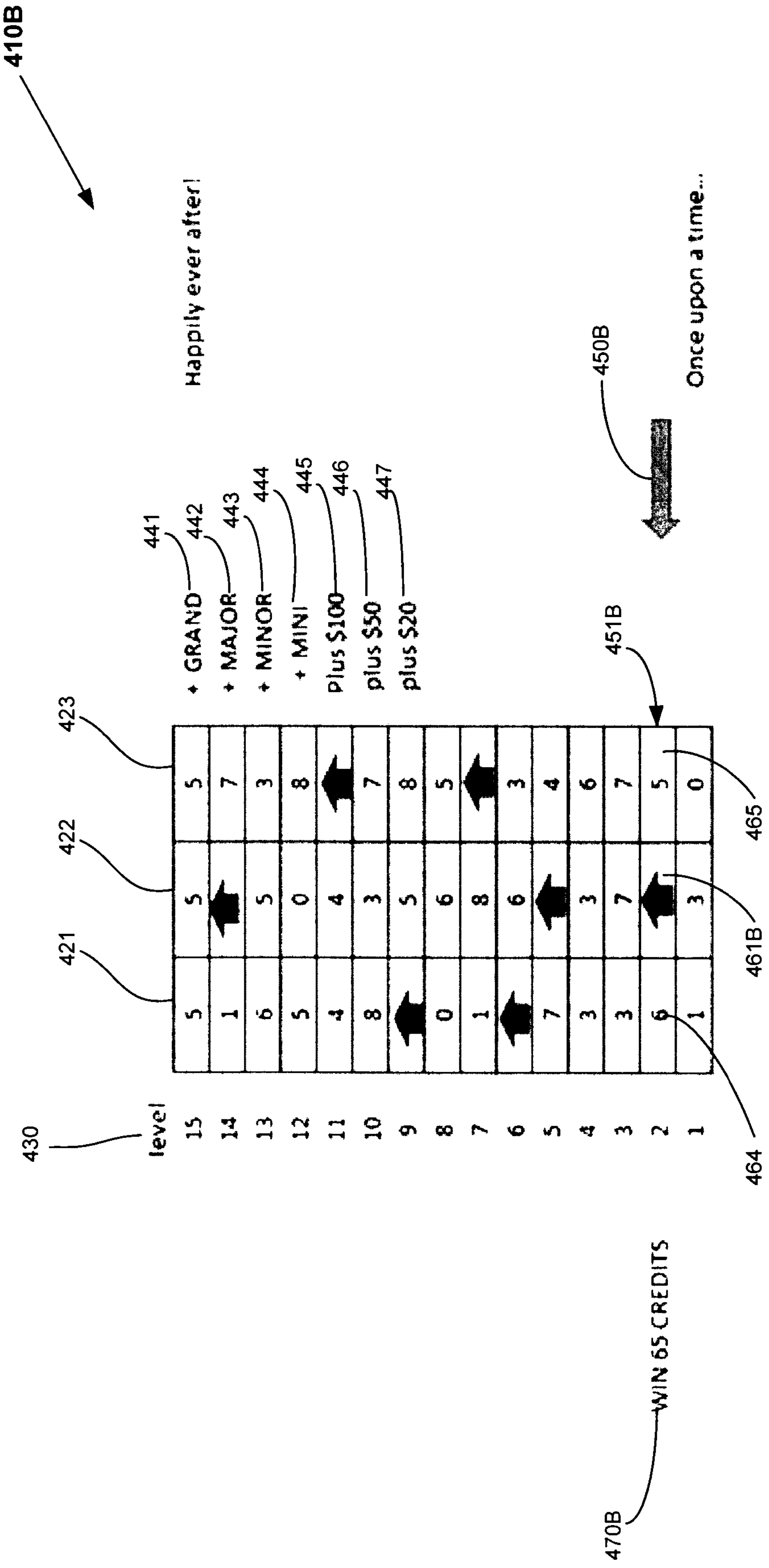

At step 325, the processor selects and displays symbols for the feature game on display 240. In one example, the memory 208 stores symbol data that specifies three feature game reel strips, which have a combination of number symbols and at least one designated symbol. In an embodiment, each of the reel strips have at least one designated symbol. In another embodiment, not all of the reel strips have at least one designated symbol. As shown in the example of FIGS. 4A and 4B below, in one example, each of the reel strips has more than one designated symbol. Each of the reel strips defines a sequence of symbols. The length of each reel strip and the specific number of designated symbols thereon are used to control the probability of the feature game advancing to a further game instance or "Level" as well as the probability of certain prizes being awarded as will be described in further detail below.

In the example shown in FIGS. 4A and 4B, the numbers on the reels are integers in the range of zero to nine. In the example, the designated symbol is an UP ARROW 461, as shown in the example if FIGS. 4A and 4B.

In an embodiment, in each game instance of the feature game, the processor 204 selects symbols from the feature game reel strips to display in three columns, each having fifteen symbol positions so that a total of 45 symbols are displayed on display 240. The symbol selection can be performed using the mechanism described in relation to FIGS. 5 and 6. For example, one symbol per column may be selected from the feature game reel strips, with the remaining symbols in the column (14 symbols in this example) taken from neighbouring reel strip positions to form the complete column. In another example, the 45 symbols may be individually selected from the feature game reel strips. While in the embodiment, symbols are selected for display in each of fifteen rows, only one row of symbol positions is evaluated in each game instance. That is, of the 45 displayed symbols, only three symbols will be selected at evaluation positions in this example. In various embodiments, only the symbols that correspond to the currently selected row (or level) may be displayed, In various embodiments, the quantity of columns (or reels) for the play of the feature game may vary, and may be predetermined, randomly determined, or change for each level.

In this respect, referring to FIG. 4A, there is shown a schematic diagram of a screen display 410A of an embodiment. In the embodiment shown in FIG. 4A, there are three columns 421, 422, 423 of symbol display positions. There are fifteen rows of symbol positions, each of which is labelled as one of fifteen Levels 430 for reasons which will become apparent. A current set of symbol evaluation positions 451A is indicated by indicator arrow 450A and corresponds to a first Level. In the example shown in FIG. 4A, an UP ARROW symbol 461A has been selected in the left most symbol position, a number symbol 462 having the value 3 has been selected in the middle position and a number symbol 463 having the value 0 has been selected in the right most symbol position.

It will be appreciated from FIG. 4A that the number of number symbols selected by the processor 204 is related to and depends on the number of arrow symbols 461 that are selected. It will also be apparent that the maximum of three number symbols can only be selected if the UP ARROW symbol 461 is not selected at any one of the set of evaluation positions 451A.

At step 330, the processor forms a prize amount 330 by concatenating the values shown on each of the number symbols. In the example shown in FIG. 4A, the values are concatenated in a defined order from left to right of the set of evaluation positions 451A, consistently with normal numeric convention. In other embodiments, the prize may be formed in a different way, for example, by combining the values of the number symbols to derive the largest possible prize value. In various embodiments, the UP ARROW symbol can substitute for a number value, that is predetermined, or randomly determined for each occurrence of the UP ARROW symbol. In certain embodiments, the number value that substitutes for the UP ARROW symbol increases for each increasing level.

Referring to the example in FIG. 4A, the values 3 as indicated by number symbol 462 and 0 as indicated by number symbol 463 are concatenated to form a prize amount of 30 credits 470A which is displayed on the display 240. At step, 335, this prize is added to the win meter in memory 208 at step 335.

At step 340, the processor 204 determines whether the symbols displayed at the evaluation positions include a designated symbol. In this case, the designated symbol is the UP ARROW symbol 461. While the symbols selected at step 325 may coincide with the symbols displayed at the evaluation positions, it should be appreciated that the symbols selected at step 325 may not necessarily be the symbols displayed at the evaluation positions. For example, the processor 204 may be configured to display the selected symbols in the row labelled Level 1, regardless of which Level the feature game has advanced to. At step 345, it is determined whether the maximum Level has been reached (in the example Level 15). As this is the first game instance, and the evaluation positions are at Level 1, the maximum Level has not have been reached and the method proceeds by repeating steps 325, step 330, step 335 and step 340. In the example shown, before these steps are repeated, the processor 204, at step 347, changes the evaluation positions, in this embodiment, by advancing them to a different Level in a defined direction relative to the array, specifically, the direction indicated by the UP ARROW 461. The rate of level advancement may be based on the number of UP ARROW symbols being selected. For example, if one UP ARROW symbol is selected at the evaluated positions (with two number symbols being selected), the processor 204 may advance the evaluation positions by one level. If two UP ARROW symbols are selected (with one number symbol being selected), the processor 204 may advance the evaluation positions by two or more levels. If three UP ARROW symbols are selected (with no number symbol being selected), the processor 204 may advance the evaluation positions by three or more levels, or directly to a designated level such as the maximum Level. It will be apparent that there is a trade-off between the size of the interim prizes and the rate of level advancement. For example, the interim prizes may be small due to a smaller number of number symbols being selected, but the rate of level advancement increases, with fewer rounds required to reach one of the levels that award additional prizes, as described below. In certain embodiments, when multiple UP ARROW symbols are selected at the evaluation positions, such as two UP ARROW symbols, the processor 204 may advance the evaluation positions by at least two levels, with each interim evaluation position being evaluated.

Returning to step 325 for evaluation of the second game instance corresponding to level 2, as indicated by indicator arrow 450B in FIG. 4B, the subset of evaluation positions 451B for the second game instance of the feature game corresponding to the second Level are selected and displayed. As shown in FIG. 4B, the processor 204 has selected a further set of symbols by selecting stopping positions for the three reels and a number symbol 464, UP ARROW symbol 461B and a further number symbol 465 are displayed at the current set of evaluation positions 451B. In this game instance, the processor 204 forms a prize by concatenating the values of the two number symbols 464, 465. Here, the values are 6 and 5 and they are concatenated to form a prize of 65 credits 470B which is displayed on the display 240 and added to the win meter.

Accordingly, it will be appreciated from the description of FIG. 3, FIGS. 4A and 4B, that the evaluation positions can advance from Level 1 to Level 15. As Level 15 is the maximum Level, once it is determined to have been reached at step 345, repetition of steps 325, 330 and 335 ceases. In the example, control moves to step 350.

As indicated in FIGS. 4A and 4B, there are prizes 441-447 associated with Levels 9 to 15 which are awarded in addition to any prizes derived by the processor 204 concatenating the values of the number symbols selected at the set of evaluation positions. In this example, a grand jackpot prize 441 is associated with Level 15, a major jackpot prize 442 is associated with Level 14, a minor jackpot prize 443 is associated with Level 13, and a mini jackpot prize 444 is associated with Level 12. In an example, each of these jackpot prizes 441 to 444 are progressive jackpot prizes, having a value derived by contributions from the gaming machines. In other embodiments, the jackpot prizes may be linked to progressive prizes that apply across a number of different gaming machines. In either case, the contributions may arise from a percentage of the wagers made to conduct the base games in the respective gaming machines. In the example, Level 11 corresponds to a fixed prize of $100 445, Level 10 corresponds to a fixed prize of $50 446, and Level 9 corresponds to a fixed prize of $20 447.

Persons skilled in the art will appreciate that other combinations of additional prizes could be used in alternative embodiments. As these prizes are awarded in addition to the prizes formed by concatenating values of the numbers on the number symbols, when the symbols displayed at the evaluation positions do not include a designated symbol at step 340, the method proceeds to step 355 of determining whether there is a prize associated with the current Level and if there is a prize associated with the Level (in this example, Levels 9-15), the method proceeds to step 350 and awards the prize for the respective Level. For example, by adding it to the win meter or the credit. After the prize is awarded at step 350, the method 300 ends at step 360. As there is a cap on the number of Levels (in the example of FIG. 4 15 Levels) when the maximum Level is reached at step 345, the method proceeds directly to awarding the prize corresponding Level 350.

It will be apparent to the skilled person that there could be alternative embodiments to the disclosure. For example, fewer columns of symbol positions (e.g. two columns) could be used to provide prizes formed from fewer values or more columns of symbol positions could be used to provide prizes formed from fewer values). In another example, fewer rows may be displayed, such as displaying as few as just the evaluated row of symbols. In this case, the evaluation positions are unchanged regardless of Levels.

It will also apparent that the numbers need not have values in the range of 0 to 9. For example, the values could have more than one digit. Alternatively, the reel strip of one or more columns may only have a subset of the values 0 to 9.

In an alternative embodiment, rather than the array being vertical as shown in FIG. 4A, the array could be horizontal with the evaluation positions corresponding to a single column. Such an embodiment could be implemented with horizontally spinning reels.

In a further embodiment, only the evaluation positions are being displayed and a separate indicator is used to indicate the current Level to which the feature game has progressed. Other embodiments will be apparent to persons skilled in the art.

An advantage of the gaming device of the embodiments is that a termination condition is incorporated into the mechanism that advances the feature game to a further game instance in a way that a larger prize will tend to be awarded when the game terminates relative to when it advances because it will be formed from more number values than when a designated symbol is present.

In an example embodiment, there is provided a gaming device comprising:

a display;

a processor; and memory storing (a) symbol data specifying a plurality of selectable symbols comprising (i) a plurality of number symbols that are used to determine a prize amount, and (ii) at least one designated symbol, (b) a meter, and c) instructions which when executed by the processor, cause the processor to:

(a) select symbols from the symbol data for display on the display at respective ones of a plurality of evaluation positions, whereby the number of number symbols selected and the number of designated symbols selected are inter-dependent;

(b) form a prize amount from each number symbol displayed at the symbol display values by concatenating numbers of the number symbols;

(c) add the formed prize to the meter;

(d) repeat steps (a) to (c) if the symbols displayed at the plurality of evaluation positions include one or more designated symbols; and (e) not repeat steps (a) to (c) if the symbols displayed at the plurality of evaluation positions do not include one or more designated symbols.

In an embodiment, the instructions cause the processor to concatenate the numbers of the number symbols in a defined order relative to the evaluation positions.

In an embodiment, the instructions cause the processor to select symbols for display in an array of symbol positions and the evaluation positions are a subset of the symbol positions.

In an embodiment, the subset of the symbols positions comprises a row of the symbol positions.

In an embodiment, the subset of the symbols positions comprises a column of the symbol positions.

In an embodiment, the instructions cause the processor to change the evaluation positions before repeating steps (a) to (c).

In an embodiment, the instructions cause the processor to change the evaluation positions by advancing them in a defined direction relative to the array.

In an embodiment, at least a subset of possible evaluation positions of the array have additional prizes associated with them.

In an embodiment, the instructions cause the processor to award a respective one of the additional prizes corresponding to the current set of evaluation positions if the process of repeating steps (a) to (c) is ended.

In an embodiment, the gaming device is configured to enable a player to establish a credit balance on the gaming device and to cash-out a credit balance.

In an embodiment, the gaming device has at least one input device adapted to receive at least one of physical currency and a token representing currency to establish the credit balance.

In an embodiment, the gaming device has at least one output device adapted to output at least one of physical currency and a token representing currency to cash-out the credit balance.

In another example embodiment, there is provided a method of operating a gaming device comprising a display and memory storing (a) symbol data specifying a plurality of selectable symbols comprising (i) a plurality of number symbols that are used to determine a prize amount, and (ii) at least one designated symbol, and (b) a meter, the method comprising:

(a) selecting symbols from the symbol data for display on the display at respective ones of a plurality of evaluation positions, whereby the number of number symbols selected and the number of designated symbols selected are inter-dependent;
(b) forming a prize amount from each number symbol displayed at the symbol display values by concatenating numbers of the number symbols;
(c) adding the formed prize to the meter;
(d) repeating steps (a) to (c) if the symbols displayed at the plurality of evaluation positions include one or more designated symbols; and
(e) not repeating steps (a) to (c) if the symbols displayed at the plurality of evaluation positions do not include one or more designated symbols.

In an embodiment, the method comprises concatenating the numbers of the number symbols in a defined order relative to the evaluation positions.

In an embodiment, the method comprises selecting symbols for display in an array of symbol positions and wherein the evaluation positions are a subset of the symbol positions.

In an embodiment, the subset of the symbols positions comprises a row of the symbol positions.

In an embodiment, the subset of the symbols positions comprises a column of the symbol positions.

In an embodiment, the method comprises changing the evaluation positions before repeating steps (a) to (c).

In an embodiment, the method comprises changing the evaluation positions by advancing them in a defined direction relative to the array.

In an embodiment, at least a subset of possible evaluation positions of the array have additional prizes associated with them.

In an embodiment, the method comprises awarding a respective one of the additional prizes corresponding to the current set of evaluation positions if the process of repeating steps (a) to (c) is ended.

In another example embodiment, there is provided a gaming system comprising:

a display;
one or more processors; and
at least one memory storing (a) symbol data specifying a plurality of selectable symbols comprising (i) a plurality of number symbols that are used to determine a prize amount, and (ii) at least one designated symbol that does not contribute to the prize amount, (b) a meter, and c) instructions which when executed by the one or more processors, cause the one or more processors to:
  (a) select symbols from the symbol data for display on the display at respective ones of a plurality of evaluation positions, whereby the number of number symbols selected and the number of designated symbols selected are inter-dependent;
  (b) form a prize amount from each number symbol displayed at the symbol display values by concatenating numbers of the number symbols;
  (c) add the formed prize to the meter;
  (d) repeat steps (a) to (c) if the symbols displayed at the plurality of evaluation positions include one or more designated symbols; and
  (e) not repeat steps (a) to (c) if the symbols displayed at the plurality of evaluation positions do not include one or more designated symbols.

In another example embodiment, there is provided computer program code which when executed by a processor of a gaming device comprising a display and memory storing (a) symbol data specifying a plurality of selectable symbols comprising (i) a plurality of number symbols that are used to determine a prize amount, and (ii) at least one designated symbol, and (b) a meter, cause the gaming machine to:

(a) select symbols from the symbol data for display on the display at respective ones of a plurality of evaluation positions, whereby the number of number symbols selected and the number of designated symbols selected are inter-dependent;
(b) form a prize amount from each number symbol displayed at the symbol display values by concatenating numbers of the number symbols;
(c) add the formed prize to the meter;
(d) repeat steps (a) to (c) if the symbols displayed at the plurality of evaluation positions include one or more designated symbols; and
(e) not repeat steps (a) to (c) if the symbols displayed at the plurality of evaluation positions do not include one or more designated symbols.

In another example embodiment, there is provided a tangible computer readable medium comprising the computer program code.

While the disclosure has been described with respect to the Figures, it will be appreciated that many modifications and changes may be made by those skilled in the art without departing from the spirit of the disclosure. Any variation and derivation from the above description and Figures are included in the scope of the present disclosure as defined by the claims.

What is claimed is:

1. An electronic gaming device comprising at least one processor configured to execute instructions stored in at least one memory device, wherein the instructions, when executed by the at least one processor, cause the at least one processor to:

cause display, on a display device, a plurality of adjacent spinnable reels, each of the spinnable reels having a plurality of rows arranged vertically;
cause display, on the display device, of a plurality of symbols as part of a base game, each symbol of the plurality of symbols displayed within a symbol position of a plurality of symbol positions within a game matrix, the game matrix including the plurality of rows of the plurality of adjacent spinnable reels;
in response to triggering a feature game from the base game, select a particular number of columns of the plurality of columns for the feature game using a first output from a random number generator (RNG), each column of the particular number of columns forming adjacent rows of symbol positions;
cause display, on the display device, of a plurality of feature symbols selected based at least in part on a second output from the RNG, each feature symbol of the plurality of feature symbols included within a symbol position of each column of the particular number of columns of symbol positions, the feature symbols including at least number symbols and/or at least one designated symbol;

cause display, on the display device, of an indicator showing a row of the plurality of rows selected as an evaluated row during the feature game, the evaluated row is selected based at least in part on a third output from the RNG;

cause the evaluated row to be evaluated by:

(a) identifying all number symbols displayed in the evaluated row and concatenating the number symbols together to create the feature award corresponding to the evaluated row;

(b) identifying any designated symbols displayed in the evaluated row; and (c) in response to the evaluated row including at least one designated symbol, cause the next upwardly adjacent row to become the evaluated row and repeat steps (a) through (c) until a termination condition occurs, wherein the termination condition includes the evaluated row not including any designated symbol or the evaluated row is a final row of the plurality of adjacent rows;

aggregate feature awards corresponding to each of the evaluated rows to determine a total feature award; and cause to display, on the display device, the total feature award to a player.

2. The electronic gaming device of claim 1, wherein to concatenate the number symbols together to create the feature award corresponding to the evaluated row, the instructions, when executed, further cause the at least one processor to concatenate at least two number symbols in the evaluated row in a defined order from left to right of symbol positions of the evaluated row.

3. The electronic gaming device of claim 1, wherein to concatenate the number symbols together to create the feature award corresponding to the evaluated row, the instructions, when executed, further cause the at least one processor to:

concatenate at least two number symbols in the evaluated row to form a largest possible prize value.

4. The electronic gaming device of claim 1, wherein the instructions, when executed, further cause the at least one processor to progressively select pluralities of symbols for addition during progressively advancing levels of play each time a designated symbol is displayed in the evaluated row during a previous feature game instance.

5. The electronic gaming device of claim 4, wherein the instructions, when executed, further cause the at least one processor to concatenate at least two number symbols of the progressively selected pluralities of symbols during each progressively advancing level of play to determine a plurality of prize values equal to the concatenated values of the at least two number symbols during each progressively advancing level of play.

6. The electronic gaming device of claim 1, wherein the instructions, when executed, further cause the at least one processor to add a bonus value to at least one of a plurality of feature awards corresponding to one or more evaluated rows.

7. The electronic gaming device of claim 1, wherein the instructions, when executed, further cause the at least one processor to, for a subset of rows of the plurality of adjacent rows when being selected as the evaluated row, to concatenate the at least two number symbols in the evaluated row from left to right and add a bonus value to yield the feature award corresponding to the evaluated row.

8. A computer-implemented method comprising:

causing display, on a display device, a plurality of adjacent spinnabie reels, each of the spinnable reels having a plurality of rows arranged vertically;

causing cause display, on the display device, of a plurality of symbols as part of a base game, each symbol of the plurality of symbols displayed within a symbol position of a plurality of symbol positions within a game matrix, the game matrix including the plurality of rows of the plurality of adjacent spinnable reels;

in response to triggering a feature game from the base game, selecting a particular number of columns of the plurality of columns for the feature game using a first output from a random number generator (RNG), each column of the particular number of columns forming adjacent rows of symbol positions;

causing display, on the display device, of a plurality of feature symbols selected based at least in part on a second output from the RNG, each feature symbol of the plurality of feature symbols included within a symbol position of each column of the particular number of columns of symbol positions, the feature symbols including at least number symbols and/or at least one designated symbol;

causing display, on the display device, of an indicator showing a row of the plurality of rows selected as an evaluated row during the feature game, the evaluated row is selected based at least in part on a third output from the RNG;

causing the evaluated row to be evaluated by:

(a) identifying all number symbols displayed in the evaluated row and concatenating the number symbols together to create the feature award corresponding to the evaluated row;

(b) identifying any designated symbols displayed in the evaluated row; and (c) in response to the evaluated row including at least one designated symbol, causing the next upwardly adjacent row to become the evaluated row and repeat steps (a) through (c) until a termination condition occurs, wherein the termination condition includes the evaluated row not including any designated symbol or the evaluated row is a final row of the plurality of adjacent rows;

aggregating feature awards corresponding to each of the evaluated rows to determine a total feature award; and causing to display, on the display device, present the total feature award to a player.

9. The computer-implemented method of claim 8, wherein to concatenate the number symbols together to create the feature award corresponding to the evaluated row comprises concatenating at least two number symbols in the evaluated row in a defined order from left to right of symbol positions of the evaluated row.

10. The computer-implemented method of claim 8, wherein to concatenate the number symbols together to create the feature award corresponding to the evaluated row comprises:

concatenating at least two number symbols in the evaluated row to form a largest possible prize value.

11. The computer-implemented method of claim 8, comprising progressively selecting pluralities of symbols for addition during progressively advancing levels of play each time a designated symbol is displayed in the evaluated row during a previous feature game instance.

12. The computer-implemented method of claim 11, further comprising concatenating at least two number symbols of the progressively selected pluralities of symbols during each progressively advancing level of play to determine a plurality of prize values equal to the concatenated values of the at least two number symbols during each progressively advancing level of play.

13. The computer-implemented method of claim 8, further comprising adding a bonus value to at least one of a plurality of feature awards corresponding to one or more evaluated rows.

14. The computer-implemented method of claim 8, further comprising, for a subset of rows of the plurality of adjacent rows when being selected as the evaluated row, concatenating the at least two number symbols in the evaluated row from left to right and add a bonus value to yield the feature award corresponding to the evaluated row.

15. A non-transitory computer-readable storage medium with instructions stored thereon that, in response to execution by at least one processor, cause the at least one processor to:

cause display, on a display device, a plurality of adjacent spinnable reels, each of the spinnabie reels having a plurality of rows arranged vertically;

cause display, on the display device, of a plurality of symbols as part of a base game, each symbol of the plurality of symbols displayed within a symbol position of a plurality of symbol positions within a game matrix, the game matrix including the plurality of rows of the plurality of adjacent spinnable reels;

in response to triggering a feature game from the base game, select a particular number of columns of the plurality of columns for the feature game using a first output from a random number generator (RNG), each column of the particular number of columns forming adjacent rows of symbol positions;

cause display, on the display device, of a plurality of feature symbols selected based at least in part on a second output from the RNG, each feature symbol of the plurality of feature symbols included within a symbol position of each column of the particular number of columns of symbol positions, the feature symbols including at least number symbols and/or at least one designated symbol;

cause display, on the display device, of an indicator showing a row of the plurality of rows selected as an evaluated row during the feature game, the evaluated row is selected based at least in part on a third output from the RNG;

cause the evaluated row to be evaluated by:

(a) identifying all number symbols displayed in the evaluated row and concatenating the number symbols together to create the feature award corresponding to the evaluated row;

(b) identifying any designated symbols displayed in the evaluated row; and (c) in response to the evaluated row including at least one designated symbol, cause the next upwardly adjacent row to become the evaluated row and repeat steps (a) through (c) until a termination condition occurs, wherein the termination condition includes the evaluated row not including any designated symbol or the evaluated row is a top row of the plurality of adjacent rows;

aggregate feature awards corresponding to each of the evaluated rows to determine a total feature award; and cause to display, on the display device, the total feature award to a player.

16. The non-transitory computer-readable storage medium of claim 15, to concatenate the number symbols together to create the feature award corresponding to the evaluated row, the instructions, when executed, further cause the at least one processor to concatenate at least two number symbols in the evaluated row in a defined order from left to right of symbol positions of the evaluated row.

17. The non-transitory computer-readable storage medium of claim 15, wherein to concatenate the number symbols together to create the feature award corresponding to the evaluated row, the instructions, when executed, further cause the at least one processor to:

concatenate at least two number symbols in the evaluated row to form a largest possible prize value.

18. The non-transitory computer-readable storage medium of claim 15, wherein the instructions, when executed, further cause the at least one processor to progressively select pluralities of symbols for inclusion in progressively advancing levels of play each time a designated symbol is displayed in the evaluated row during a previous feature game instance.

19. The non-transitory computer-readable storage medium of claim 15, wherein the instructions, when executed, further cause the at least one processor to add a bonus value to at least one of a plurality of feature awards corresponding to one or more evaluated rows.

20. The non-transitory computer-readable storage medium of claim 15, wherein the instructions, when executed, further cause the at least one processor to, for a subset of rows of the plurality of adjacent rows when being selected as the evaluated row, to concatenate the at least two number symbols in the evaluated row from left to right and add a bonus value to determine the feature award corresponding to the evaluated row.

* * * * *